(12) United States Patent  
Hong et al.

(10) Patent No.: US 8,014,060 B2
(45) Date of Patent: Sep. 6, 2011

(54) SUBSTRATE AND DISPLAY APPARATUS HAVING THE SAME

(75) Inventors: Seok-Joon Hong, Seoul (KR); Min-Ho Yoon, Gyeonggi-do (KR); Nam-Seok Roh, Seongnam-si (KR); Woo-Jae Lee, Yongin-si (KR); Jong-Seong Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 12/553,002

(22) Filed: Sep. 2, 2009

(65) Prior Publication Data

US 2010/0067097 A1  Mar. 18, 2010

(30) Foreign Application Priority Data

Sep. 18, 2008  (KR) .................. 10-2008-0091700

(51) Int. Cl.
*G02B 26/00* (2006.01)
*H01L 27/146* (2006.01)
*H01L 31/062* (2006.01)

(52) U.S. Cl. ........ 359/296; 359/228; 257/294; 257/435; 313/489

(58) Field of Classification Search .................. 359/228, 359/245, 296, 614; 257/294, 428, 438, 560, 257/E27.132, E29.032; 250/353, 515.1; 323/313, 315; 313/112, 489, 495, 582; 362/326; 438/70

See application file for complete search history.

(56) References Cited

U.S. PATENT DOCUMENTS

| 5,531,985 A * | 7/1996 | Mitchell et al. ................. 424/59 |
| 5,982,093 A * | 11/1999 | Nihashi et al. ................. 313/542 |
| 6,628,355 B1 * | 9/2003 | Takahara ..................... 349/106 |
| 6,700,226 B2 * | 3/2004 | Vendrame et al. ............ 307/148 |
| 6,963,089 B2 * | 11/2005 | Shi et al. ....................... 257/186 |
| 7,009,373 B1 * | 3/2006 | Garavan ........................ 323/313 |
| 7,045,944 B2 * | 5/2006 | Ushifusa et al. ............. 313/489 |
| 7,202,543 B2 * | 4/2007 | Cole ............................ 257/435 |
| 7,332,759 B2 * | 2/2008 | Cole ............................ 257/292 |
| 7,690,819 B2 * | 4/2010 | Seo .............................. 362/326 |
| 7,821,185 B2 * | 10/2010 | Park et al. ..................... 313/112 |
| 7,867,907 B2 * | 1/2011 | Shimomura et al. .......... 438/689 |
| 7,923,801 B2 * | 4/2011 | Tian et al. ..................... 257/440 |
| 2008/0290382 A1 * | 11/2008 | Hirota .......................... 257/291 |

FOREIGN PATENT DOCUMENTS

| JP | 2005-292474 | 10/2005 |
| JP | 2006-189582 | 7/2006 |
| JP | 2007-272045 | 10/2007 |

* cited by examiner

*Primary Examiner* — Loha Ben
(74) *Attorney, Agent, or Firm* — Innovation Counsel LLP

(57) ABSTRACT

In a substrate for a display apparatus, the substrate includes a base substrate and a shielding layer formed on a surface of the base substrate. The shielding layer has an energy bandgap corresponding to a reference wavelength of external light. Thus, the shielding layer blocks light having wavelength equal to or less than the reference wavelength, so that a wavelength band of light may be adjusted.

15 Claims, 6 Drawing Sheets

SUBSTRATE AND DISPLAY APPARATUS HAVING THE SAME

CROSS-REFERENCE TO RELATED APPLICATION

This application relies for priority upon Korean Patent Application No. 2008-91700 filed on Sep. 18, 2008, the contents of which are herein incorporated by reference in their entirety.

BACKGROUND

1. Field of the Invention

The present invention relates to a substrate and a display apparatus having the same. More particularly, the present invention relates to a substrate capable of improving display quality and a display apparatus having the substrate.

2. Description of the Related Art

In general, a display apparatus converts image data, that is in the form of electrical signals processed by an information processing apparatus, into an image that is visible to the naked eye. An electrophoretic display (EPD) is one of the display apparatuses having a thinner and lighter structure than a cathode ray tube (CRT) or a liquid crystal display (LCD).

In detail, the electrophoretic display includes a top substrate having an electrode, a bottom substrate having an electrode, and electrically charged pigment particles interposed between the top and bottom substrates. The pigment particles move toward the top or bottom substrate in response to an electric field that is applied between the top and bottom substrates. As described above, the charged particles move in response to the electric field, and this movement is referred to as electrophoresis. The electrophoretic display displays an image by using electrophoresis. In particular, since the electrophoretic display is a reflective display apparatus that displays an image by using external light, the electrophoretic display does not require an additional light source. Further, since the pigment particles are confined in a very thin layer, the electrophoretic display has advantages in terms of lightness and slimness.

However, the display quality of the electrophoretic display is gradually degraded (e.g., by external light) because the color of the pigment particles gradually changes from exposure to ultraviolet light that is generally present in the external light.

SUMMARY

Therefore, an exemplary embodiment of the present invention provides a substrate capable of blocking ultraviolet.

Another exemplary embodiment of the present invention provides a display apparatus capable of improving display quality using the substrate.

In an exemplary embodiment of the present invention, a substrate includes a base substrate and a shielding layer.

The shielding layer is formed on one surface of the base substrate to absorb external light having wavelength equal to or less than reference wavelength and incident from an outside of the substrate. The shielding layer has an energy bandgap corresponding to the reference wavelength.

The shielding layer has a bandgap of about 2.8 eV to about 3.2 eV.

The shielding layer comprises a conductive material.

In another exemplary embodiment of the present invention, a display apparatus includes a first display substrate, a second display substrate and a color layer.

The first display substrate includes a first base substrate and a pixel unit formed on the first base substrate to receive a pixel voltage. The second display substrate is coupled with the first display substrate while facing the first display substrate. The second display substrate includes a second base substrate and a shielding layer. The second base substrate faces the first base substrate. The shielding layer is provided on or under the second base substrate and includes transparent material to absorb light having wavelength equal to or less than reference wavelength and to transmit light to the color layer. The shielding layer has a bandgap of optical energy corresponding to the reference wavelength. The color layer is interposed between the first and second display substrates to display a color in response to the pixel voltage applied to the pixel unit.

The shielding layer has a bandgap of about 2.8 eV to about 3.2 eV.

The color layer includes a plurality of electrophoretic particles.

According to the above, the shielding layer can absorb light having wavelength equal to or less than reference wavelength, so that a substrate having the shielding layer can adjust a wavelength band of transmitted light.

Further, the display apparatus includes the shielding layer capable of absorbing light having wavelength equal to or less than specific wavelength, thereby blocking ultraviolet incident into the color layer. Thus, the display apparatus can prevent the color of the color layer from being changed due to the ultraviolet rays, thereby improving display quality.

BRIEF DESCRIPTION OF THE DRAWINGS

The above and other advantages of the present invention will become readily apparent by reference to the following detailed description when considered in conjunction with the accompanying drawings wherein.

DESCRIPTION OF THE EMBODIMENTS

Hereinafter, preferred embodiments of the present invention are described in detail with reference to the accompanying drawings.

Figure 1:
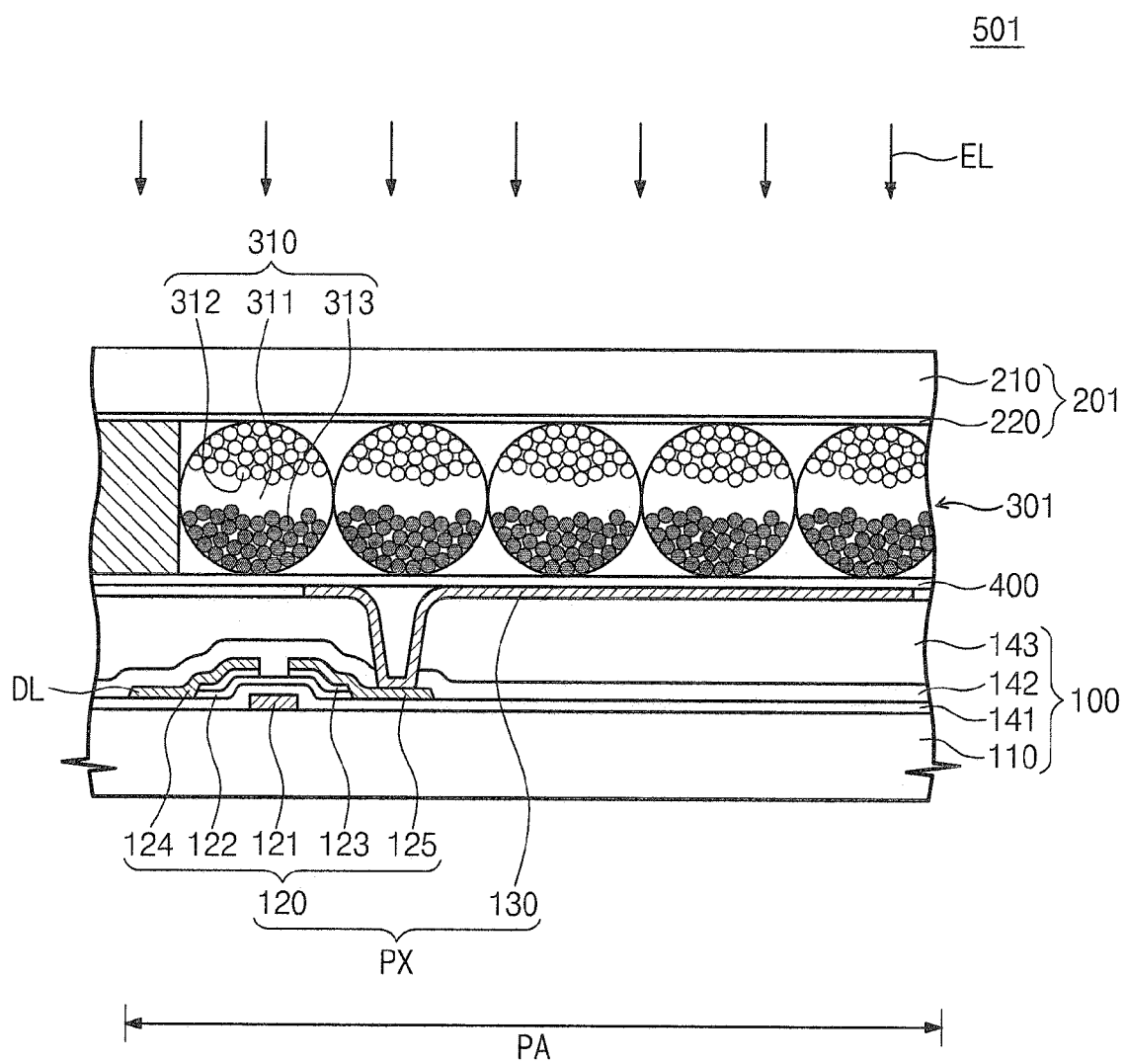
FIG. 1 is a sectional view illustrating an electrophoretic display according to an exemplary embodiment of the present invention.
Figure 2:
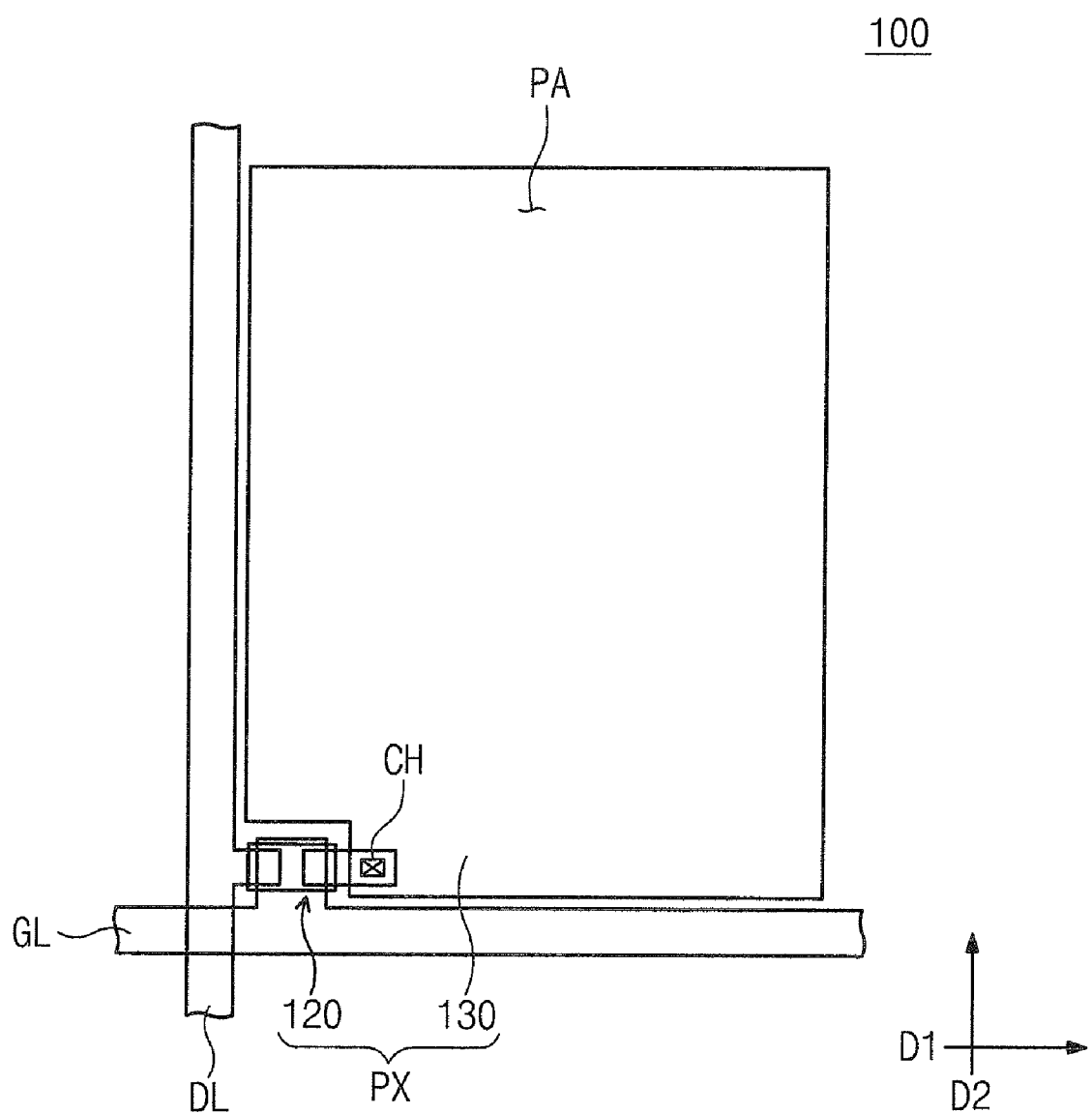
FIG. 2 is a plan view illustrating a first display substrate of the electrophoretic display shown in FIG. 1.

FIG. 1 is a sectional view illustrating an electrophoretic display according to an exemplary embodiment of the present invention and FIG. 2 is a plan view illustrating a first display substrate of the electrophoretic display shown in FIG. 1.

Referring to FIGS. 1 and 2, an electrophoretic display 501 includes a first display substrate 100, a second display substrate 201 facing the first display substrate 100, and an electrophoretic layer 301 interposed between the first and second display substrates 100 and 201. The electrophoretic layer 301 may hereinafter be referred to as a color layer.

The first display substrate 100 includes a first base substrate 110, a gate line GL, a data line DL and a pixel unit PX.

The first base substrate 110 includes a pixel area PA in which a pixel PX displays one element of an image. The pixel area PA is defined by the gate line GL and the data line DL.

The gate line GL extends in a first direction D1 on the upper surface of the first base substrate 110 and is used to transmit a gate signal. The data line DL is formed above the first base substrate 110 and the gate line GL. The data line DL is insulated from the gate line GL where it crosses the gate line GL, and extends in a second direction D2 substantially perpendicular to the first direction D1. The data line DL together with the gate line GL define the pixel area PA.

The pixel unit PX is formed in the pixel area PA. The pixel unit PX includes a thin film transistor 120 that switches a pixel voltage, and a pixel electrode 130 that is electrically connected with the thin film transistor 120.

In detail, the thin film transistor 120 includes a gate electrode 121 that extends from the gate line GL, an active layer 122, an ohmic contact layer 123, a source electrode 124 and a drain electrode 125 formed on the ohmic contact layer 123. A gate insulating layer 141 is deposited on the gate electrode 121, the gate line GL, and exposed portions of the first base substrate 110 before the active layer 122 is formed. The active layer 122 and the ohmic contact layer 123 are sequentially formed on the gate insulating layer 141 and overlap the gate electrode 121. The source electrode 124 extends from the data line DL, so that the source electrode 124 is formed on the ohmic contact layer 123. The pixel electrode 130 is electrically connected with the drain electrode 125 to receive the pixel voltage. The pixel electrode 130 includes a transparent electrically conductive material such as indium zinc oxide (IZO) or indium tin oxide (ITO).

FIGS. 1 and 2 show one pixel area PA, one gate line GL, one data line DL and one pixel unit PX. However, the first display substrate 100 includes a plurality of pixel areas, a plurality of gate lines, a plurality of data lines and a plurality of pixel units. The pixel units PX correspond to the pixel areas PA in a one-to-one manner and are aligned in the form of a rectangular array.

The first display substrate 100 includes, as already stated, a gate insulating layer 141 and further includes a protective layer 142 and an organic insulating layer 143. The gate insulating layer 141 is formed on the first base substrate 110 to cover the gate line GL and the gate electrode 121. The protective layer 142 and the organic insulating layer 143 are sequentially formed on the gate insulating layer 141 to cover the data line DL and the thin film transistor 120. Further, a contact hole CH is formed in the protective layer 142 and the organic insulating layer 143 to expose the drain electrode 125. The pixel electrode 130 is formed on the organic insulating layer 143, so that the pixel electrode 130 is electrically connected with the drain electrode 125 through the contact hole CH.

The second display substrate 201 is provided above the first display substrate 100. The second display substrate 201 includes a second base substrate 210 and a shielding layer 220.

In detail, the second base substrate 210 faces the first base substrate 110 and includes a flexible material such as polyethylene terephthalate (PET), fiber reinforced plastic (FRP) or polyethylene naphthalate (PEN).

The shielding layer 220 is formed between the second base substrate 210 and the electrophoretic layer 301. A common voltage may be applied to the shielding layer 220. The shielding layer 220 includes a transparent conductive material that allows external light EL to enter the electrophoretic layer 301 from the second base substrate 210. The external light EL may be ambient light or light provided by an external source such as a lamp.

The electrophoretic layer 301 is interposed between the first and second display substrates 100 and 201. The electrophoretic layer 301 receives the external light EL and displays predetermined colors according to an electric field direction, the electric field being formed between the pixel electrode 130 and the shielding layer 220, the electric field direction being either towards the pixel electrode 130 or towards the shielding layer 220.

In detail, the electrophoretic layer 301 includes a plurality of microcapsules 310 having a spherical shape or another suitable shape. Each microcapsule 310 may have a diameter similar to that of a human hair, for example, each microcapsule 310 has a diameter that ranges from about 200 micrometers to 300 micrometers. Each microcapsule 310 includes a fluid medium 311 containing transparent insulating liquid, and pluralities of first and second particles 312 and 313 dispersed in the fluid medium 311. The first particles 312 have an electric charge of a first polarity and the second particles 313 have an electric charge of the opposite polarity. The color of the first particles 312 is different from the color of the second particles 313. The particles 312 and 313 may hereinafter be referred to as electrophoretic particles.

For example, the first particles 312 may have a positive charge and include material such as titanium dioxide $TiO_2$ to produce a white color. The second particles 313 may have a negative charge and include carbon powder such as carbon black to produce a black color. The first and second particles 312 and 313 move to positions that are determined by the electric field formed between the first and second display substrates 100 and 201.

In detail, when a positive potential is applied between the first and second display substrates 100 and 201 in the pixel area PA, the second particles 313 move toward the first display substrate 100 and the first particles 312 move toward the second display substrate 201. Thus, the white color of the first particles 312 is displayed in the pixel area PA. However, when a negative potential is applied between the first and second display substrates 100 and 201 in the pixel area PA, the first particles 312 move toward the first display substrate 100 and the second particles 313 move toward the second display substrate 201. Thus, the black color of the second particles 313 is displayed in the pixel area PA.

The colors of the first and second particles 312 and 313 are subject to being changed by exposure to ultraviolet light. In the present invention, in order to prevent this problem from occurring, the shielding layer 220 includes material that absorbs the ultraviolet component of the external light EL before the external light EL is provided to the electrophoretic layer 301. The visible portion of the external light EL passes through the shielding layer.

In detail, the shielding layer 220 includes material that has an energy bandgap corresponding to a reference wavelength so that the shielding layer absorbs the part of the external light EL which has wavelengths equal to or less than the reference wavelength, and allows the part of the external light EL which has wavelengths larger than the reference wavelength, to pass therethrough.

The term bandgap refers to a range of electron energies, in which electrons cannot exist, as displayed in a band diagram of a crystal. In detail, the bandgap refers to a forbidden energy gap between a valence band and a conduction band in a band diagram of a semiconductor or an insulator.

Material having a specific energy bandgap absorbs photons having optical energy larger than the bandgap but does not absorb photons having optical energy smaller than the bandgap. Thus, the maximum wavelength of absorbable light varies depending on the magnitude of the bandgap of the absorbing material.

Equation 1 below represents a relation between optical energy or photon energy and wavelength.

$$E = \frac{H \times C}{W} \qquad \text{Equation 1}$$

In Equation 1, E denotes optical energy, H denotes Planck's constant, C denotes light velocity, and W denotes wavelength.

Referring to Equation 1, the optical energy E is obtained by dividing a value, which is obtained by multiplying the Planck constant H by the light velocity C, by the wavelength W. The Planck constant H and the light velocity C are constants, and the value, which is obtained by multiplying the Planck constant H by the light velocity C, is about 1228.7 eVnm. If this value is put into Equation 1, Equation 2 below is obtained.

$$E = \frac{1228.7}{W} \text{eV} \qquad \text{Equation 2}$$

Referring to Equations 1 and 2, the wavelength W is obtained by dividing 1228.7 by the optical energy E. When the bandgap of the shielding layer 220 is put into equation 2 in place of the optical energy E, the wavelength W corresponding to the bandgap of the shielding layer 220 can be calculated.

The shielding layer 220 can absorb optical energy larger than the bandgap but cannot absorb optical energy smaller than the bandgap. Since the wavelength W is inversely proportional to the optical energy E, the shielding layer 220 absorbs wavelengths smaller than the wavelength corresponding to the bandgap and allows wavelengths larger than the wavelength corresponding to the bandgap to pass therethrough.

In general, ultraviolet light has wavelengths from about 100 nm to about 400 nm and visible light used for image display has wavelengths from about 380 nm to about 780 nm. Since the ultraviolet light has wavelengths of about 400 nm or less, if the optical energy E corresponding to the wavelength of 400 nm is calculated using Equation 2, Equation 3 below is obtained.

$$E = \frac{1228.7}{400} = 3.07 \text{ eV} \qquad \text{Equation 3}$$

Referring to Equations 1 and 3, the optical energy E corresponding to the wavelength of 400 nm is about 3.07 eV. Thus, when the shielding layer 220 has a bandgap of about 3.07 eV, the shielding layer 220 can absorb light (i.e. ultraviolet) of about 400 nm or less, and allow visible light to pass therethrough. In the present exemplary embodiment, the shielding layer 220 has a bandgap of about 2.8 eV to about 3.2 eV.

The shielding layer 220 includes a transparent conductive material that satisfies the bandgap requirement described above. For example, the shielding layer 220 may include zinc oxide (ZnO)-based material or cadmium stannate ($Cd_2SnO_4$) having a bandgap of about 2.9 eV to about 3.1 eV. The zinc oxide (ZnO)-based material includes zinc oxide (ZnO) having a bandgap of about 3.2 eV, indium zinc oxide (IZO), indium Gallium zinc oxide (IGZO) and the like. Further, the shielding layer 220 may include ZnO:Al obtained by coating zinc oxide (ZnO) with aluminum (Al) or ZnO:F obtained by coating zinc oxide (ZnO) with fluorine (F). The ZnO:Al and the ZnO:F have bandgaps of about 3.2 eV.

As described above, since the shielding layer 220 has a bandgap capable of absorbing optical energy larger than the optical energy corresponding to the wavelength of about 400 nm, the shielding layer 220 can absorb the ultraviolet and allow the visible light to pass therethrough. Thus, the electrophoretic layer 301 receives external light EL having decreased ultraviolet by the shielding layer 220, so that in the electrophoretic display 501, the colors of the first and second particles 312 and 313 can be prevented from being changed and thus the display quality can be improved.

Figure 3:
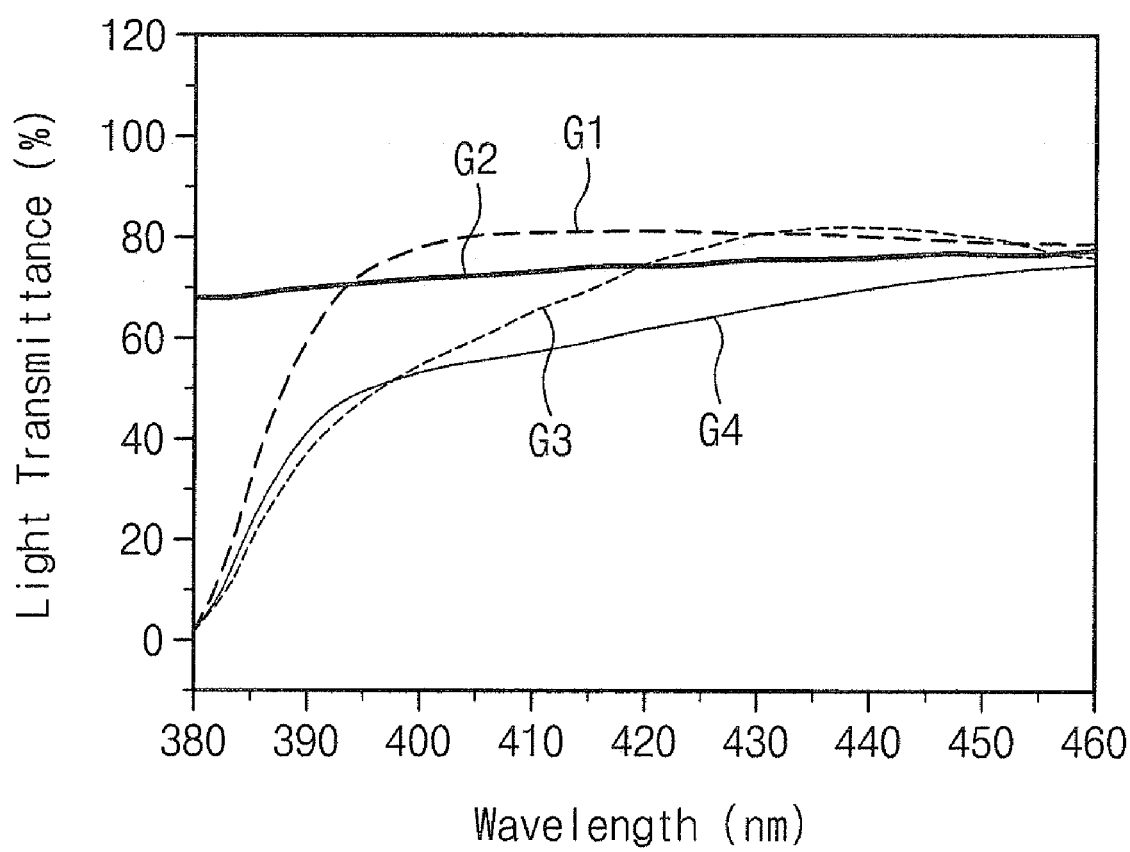
FIG. 3 is a graph illustrating light transmittance as a function of wavelength for substrates on which a zinc oxide (ZnO)-based thin film is present.

FIG. 3 is a graph illustrating light transmittance as a function of wavelength for two zinc oxide (ZnO)-based thin films in curves G3 and G4, for a substrate without a film in curve G1, and for a substrate with an indium tin oxide ITO film in curve G2.

Referring to FIG. 3, a first graph G1 represents light transmittance of a first substrate that includes polyethylene naphthalate and a second graph G2 represents light transmittance of a second substrate that is obtained by forming an indium tin oxide thin film on the first substrate. Further, a third graph G3 represents light transmittance of a third substrate that is obtained by forming an indium zinc oxide thin film on the first substrate, and a fourth graph G4 represents light transmittance of a fourth substrate that is obtained by forming an indium gallium zinc oxide thin film on the first substrate.

Referring to the first to fourth graphs G1 to G4, at wavelengths of about 400 nm or less, the light transmittance of the first substrate is less than about 77%, the light transmittance of the second substrate is less than about 70%, and the light transmittance of the third and fourth substrates is less than about 53%.

As shown in FIG. 3 and as described above, the zinc oxide-based thin films including the indium zinc oxide and the indium gallium zinc oxide absorb optical energy greater than the optical energy corresponding to the wavelength of about 400 nm and the ultraviolet transmittance of the third and fourth substrates is lower than that of the first and second substrates.

Referring again to FIG. 1, the electrophoretic display 501 further includes an adhesive member 400 that adheres the electrophoretic layer 301 to the first display substrate 100. The adhesive member 400 is interposed between the electrophoretic layer 301 and the first display substrate 100 to couple the first display substrate 100 with the electrophoretic layer 301.

Figure 4:
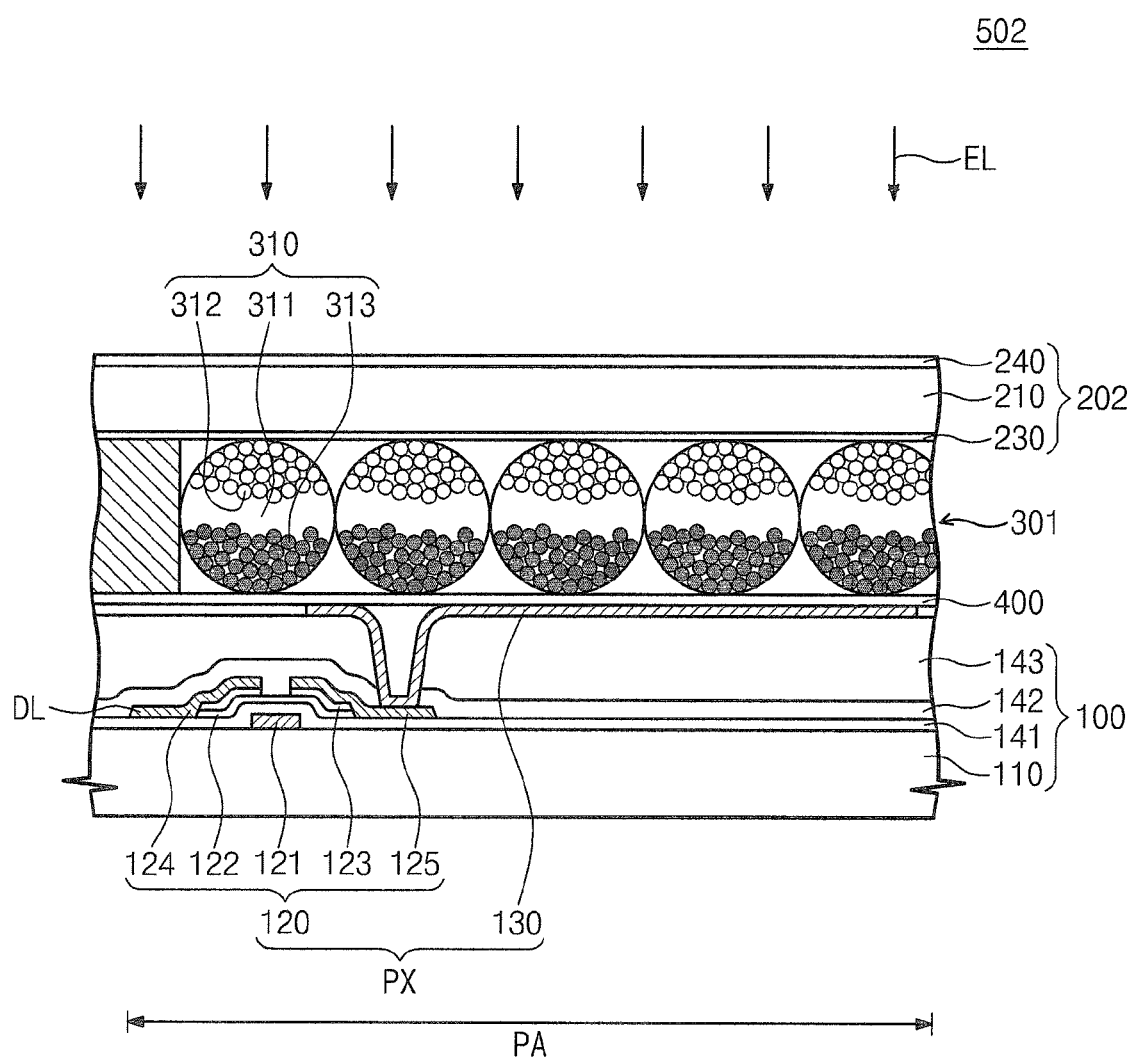
FIG. 4 is a sectional view illustrating an electrophoretic display according to another exemplary embodiment of the present invention.

FIG. 4 is a sectional view illustrating an electrophoretic display according to another exemplary embodiment of the present invention.

Referring to FIG. 4, the electrophoretic display 502 has the same structure and performs the same function as does the electrophoretic display 501 shown in FIG. 1, except for a second display substrate 202. In FIG. 4 the same reference numerals are assigned to the same elements as those of the electrophoretic display 501 and further detailed description of those elements is omitted.

The electrophoretic display 502 includes the first display substrate 100, the second display substrate 202 facing the first display substrate 100, and the electrophoretic layer 301 interposed between the first and second display substrates 100 and 202.

The first display substrate 100 includes the first base substrate 110 having the pixel area PA, and a pixel unit PX formed on the first base substrate 110 to receive a pixel voltage. The electrophoretic layer 301 receives external light EL that is used to display a predetermined color in response to the pixel voltage applied to the pixel unit PX.

The second display substrate 202 is provided on the electrophoretic layer 301, and includes the second base substrate 210, a common electrode 230 and a shielding layer 240. Since the second base substrate 210 is identical to the second base substrate 210 shown in FIG. 1, further detailed description thereof is omitted.

The common electrode 230 is formed on the lower surface of the second base substrate 210 and is interposed between the second base substrate 210 and the electrophoretic layer 301. The common electrode 230 includes a transparent electrically conductive material and may receive a common voltage.

The shielding layer 240 is formed on the upper surface of the second base substrate 210 and faces the common electrode 230 with the second base substrate 210 interposed therebetween. The shielding layer 240 includes a transparent material that absorbs ultraviolet light from the external light EL provided to the electrophoretic layer 301 while allowing visible light to pass therethrough.

In detail, the shielding layer 240 has an energy bandgap corresponding to a reference wavelength, absorbs, from the external light EL, light which has wavelength equal to or less than the reference wavelength, and transmits the external light EL having wavelength larger than the reference wavelength. Thus, the shielding layer 240 absorbs light of optical energy larger than optical energy corresponding to the reference wavelength but does not significantly absorb optical energy smaller than the optical energy corresponding to the reference wavelength.

According to one example of the present invention, the shielding layer 240 includes a material having a bandgap of about 2.8 eV to about 3.2 eV that absorbs the ultraviolet. For example, the shielding layer 240 includes one selected from the group consisting of zinc oxide (ZnO)-based material, cadmium stannate ($Cd_2SnO_4$), ZnO:Al obtained by coating zinc oxide (ZnO) with aluminum (Al) and ZnO:F obtained by coating zinc oxide (ZnO) with fluorine (F). The zinc oxide (ZnO)-based material includes the zinc oxide (ZnO), indium zinc oxide (IZO), indium Gallium zinc oxide (IGZO) and the like.

As described above, the shielding layer 240 can absorb ultraviolet light from the external light EL, so that external light EL having no ultraviolet can be provided to the electrophoretic layer 301. Thus, the color of the first and second particles 312 and 313 of the electrophoretic layer 301 can be prevented from being changed by the ultraviolet and thus the display quality can be improved.

Figure 5:
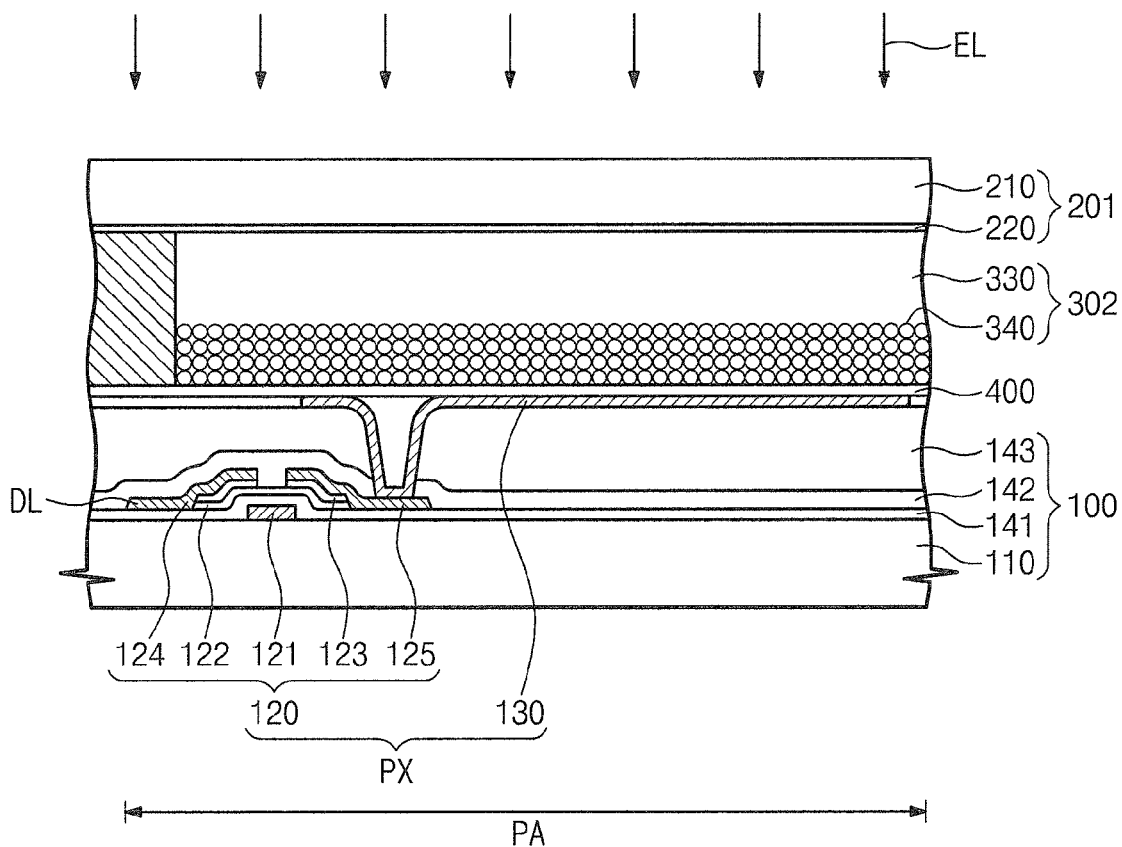
FIG. 5 is a sectional view illustrating an electrophoretic display according to yet another exemplary embodiment of the present invention.

FIG. 5 is a sectional view illustrating another exemplary embodiment of an electrophoretic display according to the present invention.

Referring to FIG. 5, the electrophoretic display 503 includes the same structure and performs the same function as those of the electrophoretic display 501 shown in FIG. 1, except for an electrophoretic layer 302. The electrophoretic layer 302 may hereinafter be referred to as a color layer. In the detailed description of the present embodiment, the same reference numerals are assigned to the same elements as those of the electrophoretic display 501 and further detailed description thereof is omitted.

The electrophoretic display 503 includes the first display substrate 100, the second display substrate 201 facing the first display substrate 100, and the electrophoretic layer 302 interposed between the first and second display substrates 100 and 201.

The first display substrate 100 includes the first base substrate 110 having the pixel area PA, and a pixel unit PX formed on the first base substrate 110, the pixel unit PX containing a pixel electrode 130 to which a pixel voltage may be applied. The second display substrate 201 includes the second base substrate 210 provided above the first display substrate 100, and the shielding layer 220 interposed between the second base substrate 210 and the electrophoretic layer 302. The shielding layer 220 receives a common voltage and also absorbs ultraviolet light from the external light EL.

The electrophoretic layer 302 receives the external light EL that has passed through the shielding layer 220 and displays one of two predetermined colors according to the direction of an electric field formed between the first and second substrates 100 and 201. In detail, the electrophoretic layer 302 includes a fluid layer 330 and a plurality of particles 340 dispersed in the fluid layer 330. The fluid layer 330 includes insulating liquid of predetermined color. The particles 340 have colors different from that of the fluid layer 330 and carry a charge that is of either positive or negative polarity. Further, the particles 340 take up positions that are adjacent to the first display substrate 100 or the second display substrate 210, depending on the direction of the electric field applied between the first and second display substrates 100 and 201 in the pixel area PA. The particles 340 may hereinafter be referred to as electrophoretic particles.

For example, when the particles 340 are particles that carry negative charge, and positive potential is applied between the first and second display substrates 100 and 201, the particles 340 move toward the first display substrate 100. Thus, a color of the fluid layer 330 is displayed through the pixel area PA. However, if negative potential is applied between the first and second display substrates 100 and 201, the negatively charged particles 340 move toward the second display substrate 201. Thus, a color of the particles 340 is displayed through the pixel area PA.

Figure 6:
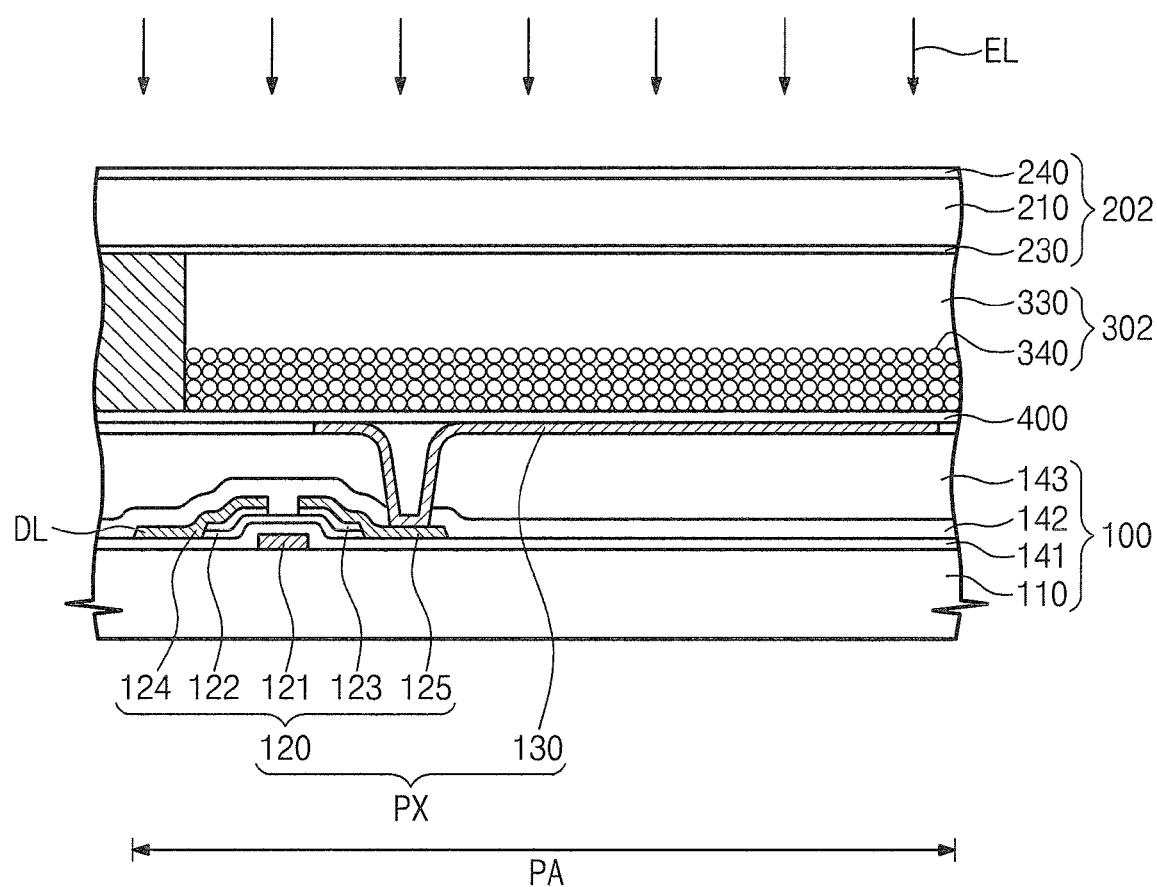
FIG. 6 is a sectional view illustrating an electrophoretic display according to another exemplary embodiment of the present invention.

The color of the particles 340 of the electrophoretic layer 302 may change due to exposure to ultraviolet light. In order to prevent the occurrence of this problem, the shielding layer 220 of the second base substrate 210 absorbs ultraviolet light from the external light EL. Thus, the electrophoretic layer 302 can receive external light EL having decreased ultraviolet by the shielding layer 220. FIG. 6 is a sectional view illustrating an electrophoretic display according to another embodiment of the present invention.

Referring to FIG. 6, the electrophoretic display 504 of the present embodiment of the invention has the same structure and function as those of the electrophoretic display 502 shown in FIG. 4, except for an electrophoretic layer 302. In the detailed description of the present embodiment, the same reference numerals are assigned to the same elements as those of the electrophoretic display 502 and further detailed description thereof is omitted.

The electrophoretic display 504 includes the first display substrate 100, the second display substrate 202 facing the first display substrate 100, and the electrophoretic layer 302 interposed between the first and second display substrates 100 and 202.

The first display substrate 100 includes the first base substrate 110 having the pixel area PA, and a pixel unit PX formed on the first base substrate 110. The pixel unit PX includes a pixel electrode 130 to which a pixel voltage may be applied.

The second display substrate 202 is provided on the electrophoretic layer 302, and includes the second base substrate 210 facing the first base substrate 110, a common electrode 230 to which a common voltage may be applied, and a shielding layer 240 that is used for blocking a significant amount of ultraviolet light.

The electrophoretic layer 302 receives the external light EL from the shielding layer 240 and displays one of two predetermined colors according to the direction of an electric field formed by the application of potential applied between the first and second substrates 100 and 201. Since the electrophoretic layer 302 is identical to the electrophoretic layer 302 shown in FIG. 4, the same reference numerals are assigned to the same elements as those of the electrophoretic layer 302 and further detailed description thereof is omitted.

According to the above, the shielding layer can block light having wavelength equal to or less than the reference wavelength, so that the substrate having the shielding layer alters the wavelength band of the transmitted light.

Further, the display apparatus includes the shielding layer capable of blocking light having wavelength equal to or less than a specific wavelength, thereby blocking the ultraviolet from being incident on the color layer. Thus, the display apparatus can prevent the colors of the color layer from being changed by the ultraviolet, thereby improving the display quality.

Although the exemplary embodiments of the present invention have been described, it is understood that the present invention should not be limited to these exemplary embodiments but various changes and modifications can be made by one of ordinary skill in the art within the spirit and scope of the present invention as hereinafter claimed.

What is claimed is:

1. A substrate comprising:
   a base substrate; and
   a shielding layer formed on one surface of the base substrate to block an external light having a wavelength equal to or less than a reference wavelength and incident from an outside of the substrate,
   wherein the shielding layer has an energy bandgap of about 2.8 eV to about 3.2 eV.

2. The substrate of claim 1, wherein the shielding layer comprises a conductive material.

3. The substrate of claim 1, wherein the shielding layer comprises zinc oxide (ZnO)-based material or cadmium stannate (Cd2SnO4).

4. A display apparatus comprising:
   a first display substrate comprising a first base substrate and a pixel unit formed on the first base substrate to receive a pixel voltage;
   a second display substrate coupled with the first display substrate while facing the first display substrate; and
   a color layer interposed between the first and second display substrates to display a color in response to the pixel voltage applied to the pixel unit,
   wherein the second display substrate comprises:
   a second base substrate facing the first base substrate; and
   a shielding layer provided on or under the second base substrate and comprising a transparent material to block a light having a wavelength equal to or less than a reference wavelength and provided to the color layer,
   wherein the shielding layer has a bandgap of optical energy corresponding to the reference wavelength.

5. The display apparatus of claim 4, wherein the shielding layer has a bandgap of about 2.8 eV to about 3.2 eV.

6. The display apparatus of claim 5, wherein the color layer comprises a plurality of electrophoretic particles.

7. The display apparatus of claim 6, wherein the second base substrate is interposed between the shielding layer and the color layer.

8. The display apparatus of claim 6, wherein the shielding layer is interposed between the second base substrate and the color layer, and comprises a conductive material to receive a common voltage.

9. The display apparatus of claim 6, wherein the shielding layer comprises zinc oxide (ZnO)-based material.

10. The display apparatus of claim 9, wherein the zinc oxide (ZnO)-based material comprises indium zinc oxide (IZO) or indium Gallium zinc oxide (IGZO).

11. The display apparatus of claim 9, wherein the shielding layer is obtained by coating the zinc oxide (ZnO)-based material with aluminum (Al) or fluorine (F).

12. The display apparatus of claim 6, wherein the shielding layer comprises cadmium stannate (Cd2SnO4).

13. A display apparatus comprising:
   a first display substrate comprising a first base substrate and a pixel unit formed on the first base substrate to receive a pixel voltage;
   a second display substrate coupled with the first display substrate while facing the first display substrate; and
   a color layer interposed between the first and second display substrates to display a color in response to the pixel voltage applied to the pixel unit,
   wherein the second display substrate comprises:
   a second base substrate facing the first base substrate; and
   a shielding layer provided on or under the second base substrate and comprising a transparent material to absorb ultraviolet incident into the color layer and to allow visible ray to pass therethrough.

14. The display apparatus of claim 13, wherein the shielding layer comprises zinc oxide (ZnO)-based material.

15. The display apparatus of claim 14, wherein the zinc oxide (ZnO)-based material comprises indium zinc oxide (IZO) or indium Gallium zinc oxide (IGZO).

* * * * *